United States Patent [19]
Barrett

[11] 3,804,473
[45] Apr. 16, 1974

[54] MECHANICALLY ACTUATED SELF-LUBRICATED ROLL

[75] Inventor: Austin Barrett, Hollis, N.H.

[73] Assignee: W. P. Evans & Son Ltd., Clifton, Manchester, England

[22] Filed: Oct. 3, 1972

[21] Appl. No.: 294,632

[52] U.S. Cl. .............................................. 308/107
[51] Int. Cl. ...................................... F16c 33/66
[58] Field of Search ....................... 308/93, 107, 187

[56] References Cited
UNITED STATES PATENTS
557,580  4/1896  Hanna et al. ........................ 308/93
3,666,049  5/1972  Kern et al. .......................... 308/187

Primary Examiner—Charles J. Myhre
Assistant Examiner—Frank Susko
Attorney, Agent, or Firm—Pearson & Pearson

[57] ABSTRACT

An elongated, multiple section roll of the straight, or bowed, type is provided with a hollow axle having lubricant passages from the interior of the axle to each bearing of each roll section. Spaced transverse partitions divide the interior of the axle into a plurality of lubricant chambers, one for each passage. An elongated rod carries a plurality of piston heads, each in one of the chambers, for simultaneously extruding lubricant to each bearing as the rod is moved axially from one end of the roll. The partitions and piston heads are detachably mounted.

7 Claims, 2 Drawing Figures

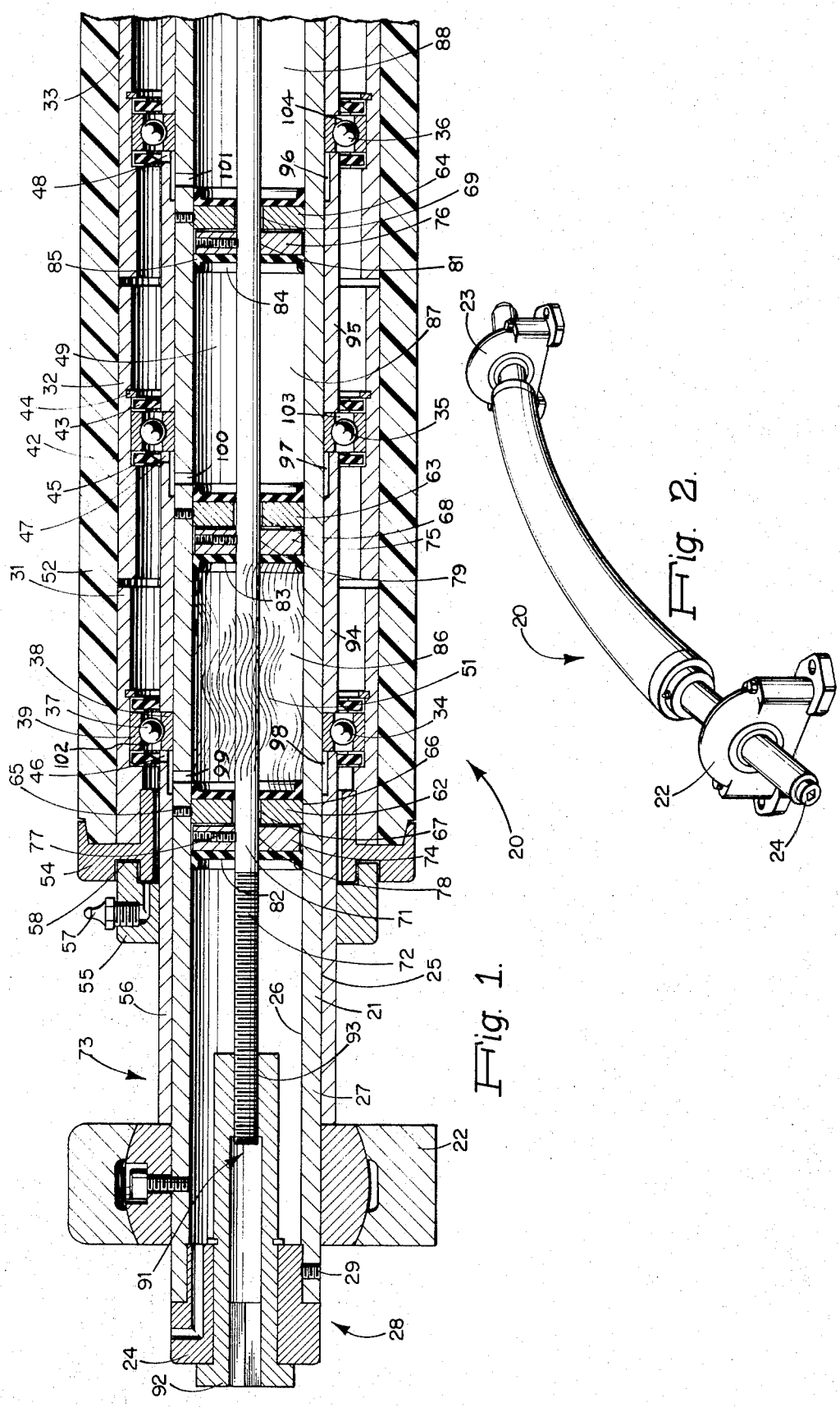

MECHANICALLY ACTUATED SELF-LUBRICATED ROLL

BACKGROUND OF THE INVENTION

This invention relates to improved rolls used in web processing, or as conveyor rolls, and especially to bowed rolls formed of multiple sections, each rotatable on bearings which require continual lubrication. It is not ordinarily practical to stop the web, or conveyor, to lubricate the roll bearings and the multiple sections are often covered by a sleeve so that they are not easily accessible for lubrication.

The bearings usually have to be replaced when the elastomeric sleeve is worn and has to be renewed. Bearing drag would contribute to the sleeve wear. With correct lubrication, the bearings should outlast two to three times the life of the sleeves and reduce the frequency of renewing of the bearings.

Bowed type rolls are much utilized in the processing of web materials to impart a lateral spreading action and consequent wrinkle-free processing of the web. These bowed rolls are generally constructed by assembling a bowed axle mounted in brackets on the processing machine. This bowed axle does not itself rotate, but has a series of bearings mounted along it. The inner races of these bearings, i.e. those adjacent the bowed axle, are fixed to the axle. The outer races of the bearings are free to rotate. These bearings carry cylinders or spools which are spaced along the roll and form a bowed support means about the central axle. An elastomeric sleeve is then slipped over the roll to form the smooth bowed surface which will contact the web of paper, film, or the like, during processing.

One operating problem is recurrent with all such rolls (and, indeed, all such similar structures) known to the prior art: there has been no economical way to assure that the bearings, and especially those bearings most remote from the ends of the roll, receive satisfactory lubrication. The most common procedure for attempting such lubrication has been to cut a slot into the stationary axle, that slot communicating with the bearings along the axle, and attempting to force lubricant from one end along the axle to the bearings. This has resulted in poor lubrication of the more remote bearings and, sometimes, too much lubrication of the bearings nearest the source of lubricant.

Although the precise problem described above has not been solved in the known art, a number of other techniques for achieving remote or semi-permanent lubrication are described in the art.

PRIOR ART

U. S. Pat. No. 1,493,765 to Philips of May 13, 1924, discloses a bowed sectional roll, devoid of covering sleeve and having a continuous lubricant passage through the center of the rolls which is filled with lubricant by a conventional grease pressure fitting at one end of the roll. A spring-pressed cap applies continuous pressure upon the lubricant in some of the rolls.

SUMMARY OF THIS INVENTION

The multiple section roll of this invention, unlike the resilient, continuous pressure on the lubricant of the above mentioned Philips device, feeds lubricant to each bearing from a chamber within the axle only when an unyieldable piston head, or plunger, is moved and only in the measured increments of lubricant required and desired. Thus, lubricant is not merely charged into a single elongated tube and spring-pressed outwardly wherever and whenever resistance is reduced and thereby unduly accumulated in the sleeve, or unduly wasted if no sleeve is used.

Instead the hollow axle of the roll is provided with detachable, transverse annular partitions, a threaded movable rod extends axially through the apertures of the annular partitions and a plurality of annular piston heads are detachably affixed along the rod, one in each chamber. Thus the chambers may be charged with lubricant and the threaded mechanism turned to advance the rod a predetermined axial distance, thereby assuring that a uniform, measured amount of lubricant will simultaneously be fed to each bearing. At intervals thereafter during the life of the roll, the threaded mechanism may be again turned to re-lubricate each bearing an equal amount with no danger of over lubrication, which might damage any web being processed, especially if no covering sleeve is used on the roll sections.

BRIEF DESCRIPTION OF THE DRAWING

FIG. 1 is a side elevation, in half section, of one end of a sectional roll, constructed in accordance with the invention;

FIG. 2 is a perspective view, on a smaller scale, of a bowed roll constructed in accordance with the invention.

As shown in the drawing, an elongated, multi-section roll 20, constructed in accordance with the invention, may be straight, as shown in FIG. 1, or bowed, as shown in FIG. 2, and includes a hollow axle 21 supported in pillow blocks 22 and 23. Suitable end plugs, such as 24, are provided in hollow axle 21, the exterior cylindrical face of the axle being designated 25 and the interior face being designated 26, and the axle wall being designated 27. The end plug 24 at the terminal end 28 of the roll is held in place by set screw 29.

A plurality of individual roll section, or sleeves, such as 31, 32 and 33, are rotatably mounted successively along the fixed hollow axle 21 by means of axially spaced bearings, such as 34, 35 and 36, each bearing having balls 37, an inner race 38 on the exterior face 25 and an outer race 39 fixed to the interior face 41 of a section. Bearing inner race 38 is axially located by the spacers 94, 95 and 56. Lubrication retaining shields 42 and 43 and retaining rings 44 cooperate with shoulder 45 to retain the shields in place and the lubricant within the bearing.

Internal spacer sleeves 94 and 95 and end spacer 56 are mounted on axle 21 having contact with inner races 38. A lubricating channel 96, 97 or 98 is cut on the inside of one end of each spacer corresponding to holes 99, 100 or 101 in wall 27 of axle 21, thus providing an access for lubrication 51 in chambers 86, 87 or 88 of the interior 49 of axle 21, through holes 99, 100 or 101. Thence into channels 96, 97 or 98, then through passages 46, 47 or 48, into bearing areas 102, 103 or 104 for direct lubrication to balls 37 in each bearing section.

The multiple sections, or spools, 31, 32 and 33 are usually enclosed in an elastomeric sleeve 52 of polymer roll-facing material which provides a smooth outer face 53 to the roll. Sleeve 52 is provided with an end cap 54 at each opposite end, the end caps being retained in place on the roll by a labyrinth ring 55 at each opposite end of the roll. The rings 55 are carried on sleeves 56 and include a grease fitting 57 for lubricating the edge groove 58 in the end caps.

The mechanical lubricating means 61 of the invention includes a plurality of axially spaced, transverse, annular partitions, such as 62, 63 and 64, each detachably retained in place in the interior 49 of hollow axle 21 by a set screw, such as 65, and each being of substantially the same outside diameter at the periphery 66 as the interior diameter of the interior face 26 of the axle. Each partition 62, 63 and 64 includes an axial bore 67, 68 or 69 which slidably receives the smooth, unthreaded face of a common piston head rod 71 extending axially of the axle 21 to a threaded end 72 at one end 73 of the axle. The partitions 62, 63 and 64 are of imperforate material, such as metal.

Mechanical means 61 also includes a plurality of non-resilient plunger members, or piston heads, 74, 75 and 76, each of annular configuration and detachably affixed along the rod 71 by a set screw, such as 77, in an axial bore 78, 79 or 81 in the head. The piston heads and partitions are substantially identical in diameter, and the piston heads are also formed of non-resilient material, such as metal.

Preferably each piston head 74, 75 and 76 is provided with an annular, cup-shaped facing member, such as 82, 83 or 84, of deformable material, such as rubber, neoprene or the like, to function in the manner of a bicycle pump in sealing the periphery 85 of each head as the head is moved axially in its respective individual lubricant chamber 86, 87 or 88 by the rod 71.

The bowed rod 71 is operable from the end 73 of the roll 21 by threaded means 91 comprising the turn nut 92 which is threadedly connected at 93 to the threads 72 at the terminal end of the rod. Thus the rod does not turn as it is slidably moved axially to simultaneously feed measured, uniform increments of lubricant to each bearing throughout the length of the roll from the piston head, or lubricant, chambers 86, 87 and 88.

The charge of lubricant in each chamber is sufficient to last for the normal life of the roll and it should be noted that the lubricant is not under constant spring pressure and therefore likely to feed out continuously from the bearings to accumulate in the sleeve, or to feed unevenly to any bearing in which looseness may be present. Instead, the periodic turning of the threaded means 91, at intervals such as once each day, or week, when experience has indicated that re-lubrication may be desirable, results in a delivery of the exact amount of lubricant required for the bearing with no undue pressure, spillage or waste and no danger of accumulation within the sleeve or leakage therefrom to damage a fabric web being treated.

I claim:

1. In an expander roll,
   a hollow bowed axle having opposite ends;
   a plurality of roll sections individually and successively mounted along said axle for rotation therearound, each on separate, spaced apart bearings;
   a plurality of annular partitions fixed at spaced distances along the interior of said hollow bowed axle to form an individual lubricant chamber for each said bearing;
   a common, smooth-faced, bowed piston rod extending axially within said bowed axle from one end to the other end thereof;
   a plurality of piston heads, each in one of said chambers and fixed at spaced distances along said bowed common piston rod
   said axle having a plurality of passages therealong, each connecting one of said chambers to one of said bearings;
   and mechanical means operable from one end of said roll for axially moving said common piston rod to uniformly apply pressure to lubricant in said chambers to lubricate said bearings.

2. In an elongated bowed expander roll of the type having a plurality of individual bearings spaced along a hollow bowed axle and supporting multiple roll sections, said bowed axle having lubricant passages for each said bearing connecting with the hollow interior thereof, the combination of:
   a common, smooth-faced, bowed piston rod extending axially within said bowed axle from one end to the other end thereof:
   a plurality of individual piston head chambers spaced along said hollow interior of said axle, each chamber connecting with one of said passages;
   a plurality of piston heads fixed at spaced distances along said rod, each in one of said chambers; and mechanical means, operable from one end of said roll, for slidably moving said common, bowed piston rod to move all of said piston heads simultaneously and axially in uniform increments to apply lubricant through said passages to said bearings.

3. An elongated roll as specified in claim 2, wherein:

said piston head chambers are formed by a plurality of transverse, imperforate partitions within, and spaced along, said axle each having an axial bore slidably receiving said bowed common piston rod.

4. An elongated roll as specified in claim 2, wherein:

said mechanical means includes a threaded terminal end on said common piston rod and
   turn-nut means threadedly connected to said threaded terminal end of said rod for moving said rod axially to apply pressure to the lubricant in said chambers.

5. In a multi-section roll having a plurality of bearings spaced along the exterior of a hollow axle and having a lubricant passage from the interior of the axle to each bearing, the combination of:
   a plurality of partitions spaced along the interior of said axle, each having an axial bore, and forming lubricant compartments therealong;
   a rod extending axially along the interior of said axle and axially slidable in said axial bores, said rod having a terminal end;
   a plurality of piston heads fixed to said rod, at spaced distances therealong, one to each lubricant compartment, and
   mechanical means operable from one end of said axle and connected to said terminal end of said rod for axially moving said rod for simultaneously supplying a uniform measured amount of lubricant to each bearing under pressure.

6. A roll as specified in claim 5, plus:

a cup shaped element of resilient deformable material affixed to each said piston head for engaging said lubricant.

7. A roll as specified in claim 5, wherein:
said mechanical means is a turn nut threaded to said terminal end and turnable from outside said roll to axially move said rod and piston heads while said roll is rotating.

* * * * *